United States Patent [19]

Jones

[11] Patent Number: 4,538,157

[45] Date of Patent: Aug. 27, 1985

[54] FLUID JET PRINTER AND METHOD OF OPERATION

[75] Inventor: David E. Jones, Richardson, Tex.

[73] Assignee: The Mead Corporation, Dayton, Ohio

[21] Appl. No.: 468,439

[22] Filed: Feb. 23, 1983

[51] Int. Cl.³ .............................................. G01D 15/18

[52] U.S. Cl. .................................. 346/75; 346/140 IJ

[58] Field of Search ........... 346/75, 1, 140 IJ, 140 PD

[56] References Cited

U.S. PATENT DOCUMENTS

| | | | |
|---|---|---|---|
| 4,031,561 | 6/1977 | Paranjpe | 346/1 |
| 4,160,982 | 7/1979 | Keur | 346/75 |
| 4,238,805 | 12/1980 | Paranjpe et al. | 346/75 |
| 4,305,079 | 12/1981 | Mix, Jr. | 346/75 |
| 4,413,265 | 11/1983 | Kockler et al. | 346/75 X |

OTHER PUBLICATIONS

IBM Technical Disclosure Bulletin, "Ink Jet Head" by K. A. Krause, vol. 19, No. 8, Jan. 1977, pp. 3216, 3217.

IBM Technical Disclosure Bulletin, "Charge Electrode Alignment & Retraction", A. L. Mix, vol. 20, No. 1, Jun. 1977, pp. 33, 34.

Research Disclosure "Pivotable Charge Plate", Dave E. Jones, Mar. 1982, pp. 59, 60.

*Primary Examiner*—George H. Miller, Jr.

*Attorney, Agent, or Firm*—Biebel, French & Nauman

[57] ABSTRACT

A fluid jet printer is disclosed having a print head which generates a plurality of jet drop streams, and a drop charging means including a notched charge electrode plate in which a plurality of charge electrodes are defined by electrically conducted coatings within notches spaced along one edge of the plate. A mounting means pivotally supports the charging means such that the charge electrode plate may be pivoted between an operating position in which each charge electrode partially surrounds a corresponding one of the fluid filaments emerging from the print head, and a retracted position in which the charge electrodes are retracted from the fluid filaments. The charge electrode plate is pivoted into its operating position after start-up of the print head means and, further, is pivoted into its retracted position prior to shutdown of the print head means. By this technique, fluid contamination of the charging means by jet drops which are generated unstably at start-up and shutdown is prevented.

11 Claims, 5 Drawing Figures

FLUID JET PRINTER AND METHOD OF OPERATION

BACKGROUND OF THE INVENTION

The present invention relates to fluid jet printing and, more particularly, to a fluid jet printer in which printer operation and reliability during start-up and shutdown are enhanced. Specifically, the present invention provides a means for reducing fluid contamination of charge electrodes by drops from unstable jet drop streams.

Fluid jet printers typically include a print head, defining a fluid manifold or reservoir, to which electrically conductive fluid, such as ink, is supplied under pressure. A plurality of orifices defined by an orifice plate communicate with the fluid reservoir. The orifices may typically be arranged in one or more rows. Ink is forced under pressure through the orifices and emerges as a plurality of fluid filaments. The filaments are caused to break up into streams of fluid drops of substantially uniform size and spacing by mechanical stimulation of the print head, by mechanical stimulation of the orifice plate, or by generating pressure waves which travel through the fluid in the fluid reservoir.

Charge electrodes are positioned beneath the orifice plate, adjacent the ends of the fluid filaments. Electrical charge potentials are selectively applied to the charge electrodes to induce corresponding electrical charges on the drops formed from the fluid filament tips. The charged and uncharged drops then pass downward through a deflection field, with the charged drops being deflected, and the uncharged drops passing unaffected through the field. Drops which are not to be deposited on a print receiving medium are caught by a drop catcher as a result of their trajectories, whereas the balance of the drops strike the print receiving medium and, collectively, form a print image thereon. Drops may be charged binarily or, alternatively, they may be charged to a plurality of charge levels, as required by the particular printer configuration.

During the start-up of the printer as the fluid pressure within the fluid reservoir is increased to an operating level, the fluid flow through the orifices and the formation of drops from the fluid filaments are extremely irregular and unpredictable. Exceptionally large drops of ink may be formed from the filaments, and the trajectories and velocities of such drops are relatively uncontrolled. As a consequence, problems have been experienced with prior art fluid jet printers during start-up involving wetting of the charge electrodes. Errant drops may accumulate on the electrodes, causing the charge electrodes to short out or interfering with the trajectories of the jet drop streams once stable jet operation is obtained. Similar problems are encountered during shutdown of prior art printers as the pressure of the fluid in the reservoir is reduced, and fluid flow through the orifices is terminated.

Several approaches have been taken to overcome the problems presented by jet instability at start-up and shutdown of a fluid jet printer. In *IBM Technical Disclosure Bulletin,* Vol. 20, No. 1, June 1977, pages 33, 34, a charge electrode structure is shown in which a notched charge plate is pivotally mounted to rotate about an axis parallel to the row of orifices in the print head and perpendicular to the jets. The charge plate defines a plurality of notches along one of its edges which are lined with electrically conductive material. Each lined notch acts as the charge electrodes. By providing such a notched configuration, the charge plate may be moved into its operating position, in which each of the notched electrodes partially surrounds a corresponding fluid filament, after start-up is completed. Additionally, the charge plate may be moved to a retracted position prior to shutdown of the print head. By this technique, wetting of the charge electrodes is prevented.

In an alternative embodiment, the charge plate is mounted on a "cardo spring" and is translated into and out of its operating position by means of a cam contacting the end of the charge plate support structure. Movement of the charge plate in this embodiment is generally in the plane of the plate. The charge plate pivot embodiment is somewhat disadvantageous in that a substantial amount of space around the charge plate must be kept open to allow for the pivoting movement of the charge plate. The cardo spring embodiment, on the other hand, is disadvantageous in that movement of the charge plate may not be precisely controlled.

*IBM Technical Disclosure Bulletin,* Vol. 19, No. 8, January 1977, pages 3216, 3217, discloses an ink jet printer in which a pair of charge electrode plates are moved laterally into and out of operating positions after start-up and prior to shutdown, respectively. A similar charge electrode movement is shown in U.S. Pat. No. 4,238,805, issued Dec. 9, 1980, to Paranjpe et al. In both instances, notched charge electrode plates are translated into and out of operating positions in a direction perpendicular to the row or rows of jet drop streams. While such an arrangement permits a charge electrode plate to be retracted during start-up and shutdown, thus reducing substantially the possibility of fluid contamination of the charge electrodes, translational movement may be somewhat difficult to produce and to control precisely. Since the jet drop streams in a jet drop printer are typically positioned very closely together, on the order of 120 streams per inch along the row, it will be appreciated that the charge electrode grooves or notches are very small and closely spaced, and that very precise movement of a charge electrode plate into and out of its operating position must be produced to prevent the charge electrodes from contacting the fluid filaments.

U.S. Pat. No. 4,305,079, issued Dec. 8, 1981, to Mix, discloses an ink jet printer having a charge electrode plate which defines charge electrode notches along one edge thereof. The charge electrode plate is mounted on a bracket which, in turn, is pivotally mounted to the print head of the printer such that the charge plate may be pivoted about an axis parallel to the jet drop streams into a retracted position at start-up and shutdown of the printer.

The pivot mounting arrangement is such, however, that the direction of movement of the charge plate is not perpendicular to the edge of the charge plate and therefore not parallel to the sides of the notches. As a consequence, the notches must be sufficiently wide so that the sides of the notches do not touch the jets as the charge plate is pivoted. Therefore, the spacing between notched charge electrodes and adjacent jets produced by the print head may be too great for some printing applications.

Accordingly, it is seen that there is a need for a fluid jet printer and a method of printer operation in which a charge electrode plate is moved into and out of an operating position after start-up and prior to shutdown, respectively, in a reliable, precisely controlled fashion.

SUMMARY OF THE INVENTION

A fluid jet printer for printing on a print receiving medium includes print head means for generating a plurality of jet drop streams arranged in a row and directed at the print receiving medium. A plurality of fluid filaments emerge from the print head and break up into jet drop streams. A drop charging means includes a notched charge electrode plate in which a plurality of charge electrodes are defined by electrically conductive coatings within notches spaced along one edge of the plate. The drop charging means permits selective electrical charging of drops in each of the jet drop streams when electrical charging potentials are selectively applied to the charge electrodes and the charge electrodes partially surround corresponding fluid filaments. A drop control means deflects the drops in dependence upon the electrical charges carried thereby and catches at least some of the drops.

A mounting means pivotally supports the charging means such that the charge electrode plate may be pivoted between an operating position, in which each charge electrode partially surrounds a corresponding one of the fluid filaments emerging from the print head, and a retracted position, in which the charge electrodes are retracted from the fluid filaments. The mounting means provides for pivoting the charge electrode plate about an axis parallel to each of the streams and in line with the row of jet drop streams. A means for pivoting the charge electrode plate into its operating position after start-up of the print head means and for pivoting the charge electrode plate into its retracted position prior to shutdown of the print head means is provided, whereby contamination of the charging means by jet drops generated unstably at start-up and shutdown is prevented.

The mounting means may include means defining a pivot support, mounted to the print head means at one end thereof, for pivotally engaging the drop charging means. The mounting means may further include means defining a support surface, mounted to the print head means at a second end thereof opposite the one end, for supporting the opposite end of the drop charging means and permitting the drop charging means to slide over the support surface as the charge electrode plate is pivoted.

The means defining a pivot support may comprise a first bracket attached to the print head means, and a pivot shaft supported by the first bracket, generally parallel with the fluid filaments and in line with the row of jet drop streams. The means defining a support surface may comprise a second bracket attached to the print head means, and a first stop, supported by the second bracket, for contacting the drop charging means as the charge electrode plate is pivoted into its retracted position.

The drop charging means may further comprise a first end member and a second end member. The first end member is attached to the charge electrode plate at a first end thereof and defines a pivot opening engaging the pivot shaft. The second end member is attached to the charge electrode plate at a second end thereof and defines an opening therein engaging the first stop. The first and second end members may be adhesively bonded to the charge electrode plate.

The jet printer may further comprise a second stop, mounted on the print head, for contacting the second end member when the charge electrode plate is pivoted into its operating position. The means for pivoting the charge electrode plate may comprise an actuator means for applying an actuation force to the second end member tending to move the charge electrode plate into its operating position. The means for pivoting the charge electrode plate may further include spring means for applying a spring force to the drop charging means in opposition to the actuation force.

A method of operating a jet printer includes the steps of initiating production of jet drop streams with the charge plate being retracted from the streams and, thereafter, pivoting the charge plate about an axis parallel to the streams into an operating position in which the charge electrodes are in sufficient proximity to the streams to permit selective charging of drops in the streams. The streams may be arranged in a row and the method may include the further step of pivoting the charge plate about an axis aligned with the row. The method may include the additional steps of pivoting the charge plate about the axis from the operating position into a retracted position in which the charge plate is sufficiently removed so as not to become contaminated by unstable jet drop streams, and thereafter terminating production of the jet drop streams.

Accordingly, it is an object of the present invention to provide a jet printer and method of printer operation in which the charge electrode plate is movable between an operating position in which notched charge electrodes partially surround respective fluid filaments from which the jet drop streams are produced, and a retracted position in which the charge electrodes are removed from the operating position so as to reduce the likelihood of fluid contamination of the charge electrodes; to provide such a printer and method in which the jet drop streams are arranged in a row and in which the charge electrode plate is pivoted about an axis parallel to the streams and in line with the row of streams; to provide such a printer and method in which the charge electrode plate is adhesively bonded to end members; and to provide such a printer and method in which one end member defines the pivot axis and the other end member receives an actuation force which moves the charge electrode plate from its retracted position into its operating position against an opposing spring force.

Other objects and advantages of the invention will be apparent from the following description, the accompanying drawings and the appended claims.

DETAILED DESCRIPTION OF THE PREFERRED EMBODIMENT

Figures 1, 2, 3:
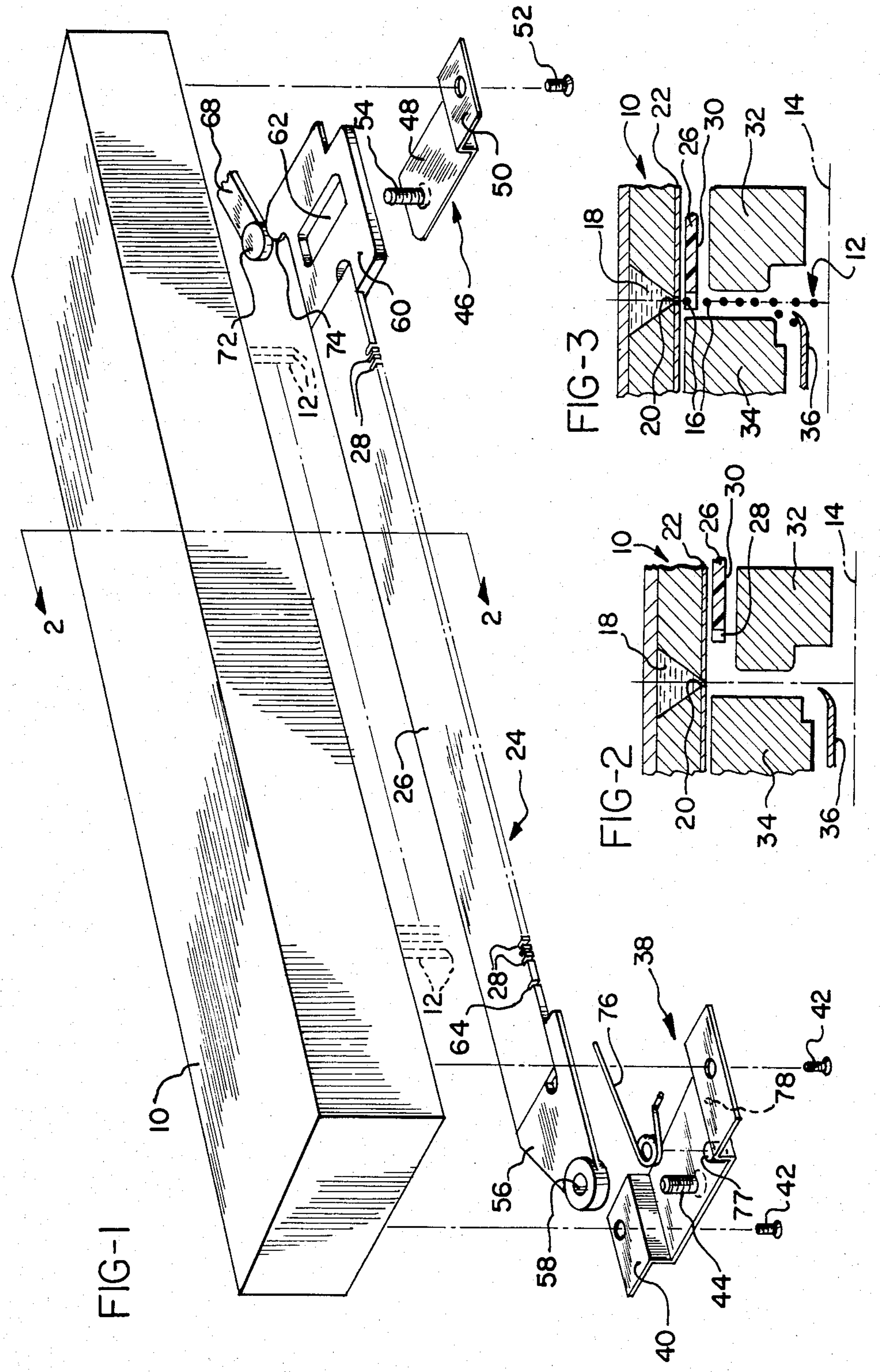
FIG. 1 is an exploded perspective view of the jet printer of the present invention.
FIG. 2 is a sectional view of the printer, taken generally along line 2—2 in FIG. 1, showing the charge electrode plate in its retracted position.
FIG. 3 is a sectional view, similar to FIG. 2, showing the charge electrode plate in its operating position.

Reference is now made to FIGS. 1 and 3 which illustrate the ink jet printer of the present invention. The printer includes a print head means 10 which generates a plurality of jet drop streams 12 arranged in a row and directed at a print receiving medium, indicated at 14, which may for example be a sheet or web of paper. A plurality of fluid filaments 16 emerge from the print head 10 and break up into the jet drop streams 12. Print head 10 typically includes means defining a fluid reservoir 18 to which fluid is applied under pressure. Print head 10 further comprises a plurality of orifices 20 which communicate with the reservoir 18 and from which the filaments 16 emerge. As is known, mechanical stimulation is applied to the print head 10, the fluid in reservoir 18, or the relatively thin orifice plate 22 which defines the orifices 20, in order to produce break up of the fluid filaments into drops of substantially uniform size and spacing and stable predictably trajectories.

The ink jet printer further includes drop charging means 24, having a notched charge electrode plate 26 in which a plurality of charge electrodes 28 are defined by electrically conductive coatings within notches spaced along one edge of plate 26. The spacing between notches corresponds to the spacing between jet drop streams. The drop charging means permits selective electrical charging of drops in each of the jet drop streams 12 when electrical charging potentials are selectively applied to the charge electrodes with the charge electrodes positioned partially surrounding corresponding fluid filaments, as shown in FIG. 3. Electrodes 28, it will be appreciated, are spaced along substantially the entire length of plate 26 but are only illustrated individually in the drawings at the ends of plate 26 for purposes of clarity. The notched charge electrode plate typically is formed of an electrically non-conductive material which has been notched along one edge, the notches coated with conductive material to form electrodes 28 and printed circuit conductors 30 added to the lower surface of the plate 26. Conductors 30 are electrically connected by an appropriate connector cable (not shown) to charge electrode driver circuitry which provides the appropriate electrical charge potentials under control of a computer or other image data source.

The printer further includes drop control means for deflecting drops in dependence upon the electrical charges carried by the drops and for catching at least some of the drops. As seen in FIG. 3, the drop control means includes a deflection electrode member 32, and a catcher 34 having a lower lip 36. An electrical deflection potential is placed across deflection electrode member 32 and catcher 34, thus producing an electrical deflection field therebetween which tends to deflect charged drops toward catcher lip 36. A partial vacuum is applied to the cavity above lip 36, such that drops which are caught on lip 36 are carried away.

Figure 4:
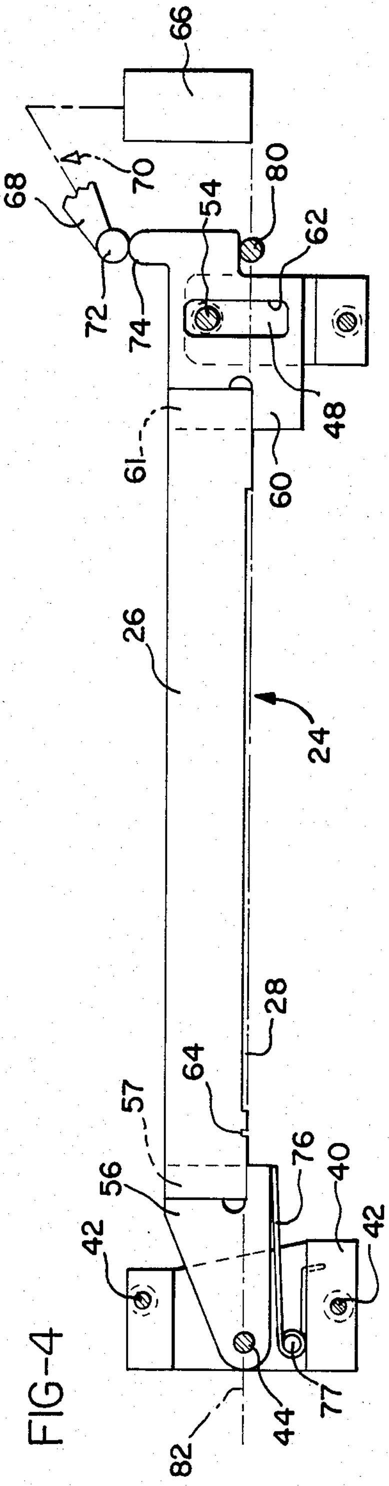
FIG. 4 is a top view of the drop charging means, including the mounting means and the means for pivoting the charge electrode plate, with the plate shown in its operating position.

A mounting means is provided for pivotally supporting charging means 24 to permit the charge electrode plate 26 to be pivoted between an operating position, illustrated in FIG. 4, in which each charge electrode partially surrounds a corresponding one of the fluid filaments emerging from the print head 10, and a retracted position in which the charge electrodes are retracted from the fluid filaments. The mounting means provides for pivoting the charge electrode plate about an axis which is parallel to each of the streams and in line with the row of jet drop streams.

The mounting means comprises means 38 defining a pivot support, mounted to the print head means 10 at one end thereof, for pivotally engaging the drop charging means. The means 38 includes a first bracket 40 attached to the print head means by threaded screws 42, and a pivot shaft defined by screw 44 supported by the bracket 40. The screw 44 extends through an opening in bracket 40 and also engages print head 10. The pivot shaft is generally parallel with the fluid filaments and is in line with the row of jet drop streams 12. In an alternative construction, the pivot shaft may comprise a pin pressed into an opening in the print head 10.

The mounting means further includes means 46 defining a support surface 48, mounted to the print head means 10 at a second end thereof opposite the end to which bracket 40 is attached. The means 46 supports the opposite end of the drop charging means 24 and permits the drop charging means to slide over the support surface 48 as the charge electrode plate 26 is pivoted. The means 46 includes a second bracket 50 which is attached to print head means 10 by screw 52, and a first stop defined by bolt 54 which extends through bracket 48 and engages print head 10. The stop 54 contacts the drop charging means, as discussed further below, as the charge electrode plate 26 is pivoted into its retracted position, shown in FIG. 5. If desired, a pin pressed into the print head 10 may be substituted for the bolt 54 as the first stop.

The drop charging means includes a first end member 56, which is attached to the charge electrode plate 26 at a first end thereof. Charge plate 26 is received within a recess 57 defined by member 56. Member 56 further defines a pivot opening 58 which engages the pivot shaft on bolt 44. The drop charging means further includes a second end member 60 which is attached to the charge electrode plate 26 at a second end thereof. Charge plate 26 is received within a recess 61 defined by member 60. Member 60 further defines an opening 62 engaging the first stop 54. Typically, the first and second end members 56 and 60 are adhesively bonded to charge electrode plate 26. It will be appreciated that the relative position between the end members 56 and 60 and the charge electrode plate 26 at the time that members 56 and 60 are bonded to the charge electrode plate 26 is critical in assuring that the charge electrode notches 28 are properly positioned during operation of the printer. Toward this end, a reference notch 64 is provided along the edge of plate 26. Notch 64 is precisely positioned with respect to the first of the electrode notches 28. As a consequence, when the members 56, 60, and plate 26 are assembled in a jig, prior to adhesive bonding, positioning of the plate 26 such that notch 64 is a specified distance from the center of opening 58 results in the notches 28 being positioned a proper distance from the center of opening 58.

The printer further includes means for pivoting the charge electrode plate into its operating position (FIGS. 3 and 4) after start-up of the print head means 10 and for pivoting the charge electrode plate into its retracted position (FIGS. 2 and 5) prior to shutdown of the print head means 10, whereby contamination of the charging means by jet drops generated unstably at start-up and shutdown is prevented. This means includes a pneumatic actuator 66 (FIGS. 4 and 5) which is linked to lever arm 68, which arm pivots about point 70. Lever arm 68 defines a cylindrical end portion 72 which contacts the curved surface 74 of member 60. The actuator means applies an actuation force to the second end member 60 which tends to move the charge electrode plate 26 into its operating position. In opposition to this actuation force, a spring 76 mounted on boss 77, having one end engaging member 56 and the other end extending through opening 78 in bracket 40, applies a spring force to member 56 tending to move the charge means 24 into its retracted position.

Figure 5:
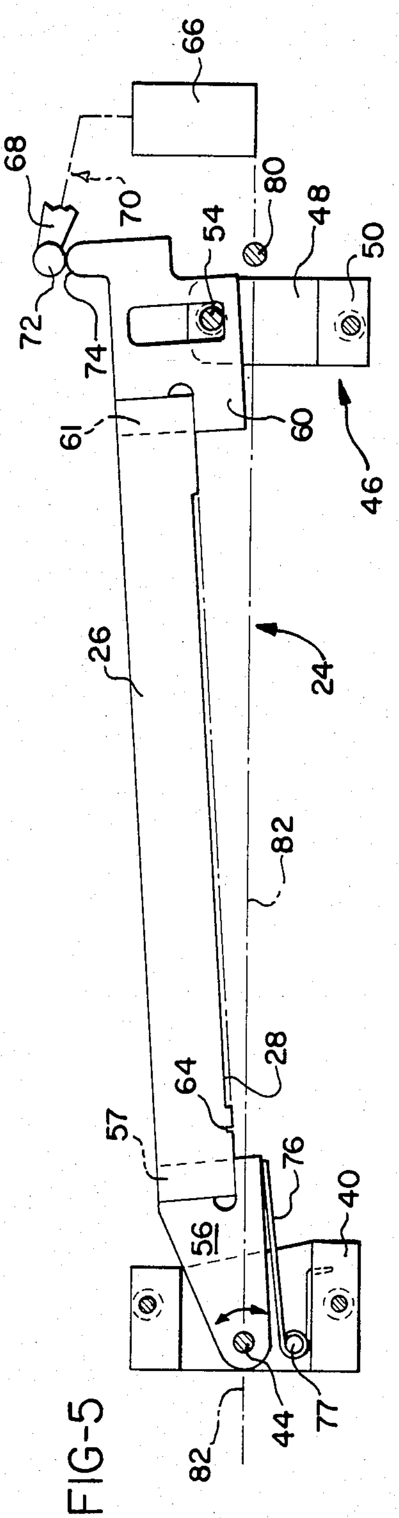
FIG. 5 is a view, similar to FIG. 4, showing the charge electrode plate pivoted into its retracted position.

At start-up of the jet printer of the present invention, the charge electrode plate 26 is in its retracted position, illustrated in FIGS. 2 and 5. Note that the charge electrode plate 26 is held in its retracted position by the force of spring 76 pivoting the charge means 24 counterclockwise as seen in FIG. 5 to a point where the first stop 54 contacts one end of the opening 62 in the member 60. Fluid is applied to the reservoir 18 under pressure and emerges from the orifices 20 as fluid filaments which break up into jet drop streams 12. A catch pan may be positioned beneath the row of jet drop streams during start-up to catch the drops which typically will vary in size and spacing and, due to the unstable nature of the jets, be unacceptable for printing. Alternatively, the catcher 34 may be moved into a position beneath the orifices 20 so as to catch all of the drops from the streams 12 without the necessity for charging and deflection of the drops.

After stable drop generation is obtained, air cylinder 66 is actuated, pivoting the charge means into its operating position as shown in FIG. 4, with the member 60 striking a second stop 80. Stop 80 may preferably be a bolt which extends down from the bottom of print head 10. The axis of rotation of the charge plate is coincident with the center of bolt 44 and is parallel with the jet drop streams 12. Further, the axis of rotation is aligned with the row of streams, which streams are positioned generally along a line 82 as indicated in FIGS. 4 and 5.

Since the axis of rotation of the charge means 82 is aligned with the row of jet drop streams, the initial movement of the charge electrodes 28 is substantially perpendicular to the row. Therefore, the sides of notches 28 do not come in contact with the jet drop streams when the charge electrode plate is moved into or out of its operating position. Although the second stop 80 is shown as being aligned with the row of jet drop streams, it will be appreciated that this need not be the case. The stop 80 can be located at any point as long as it contacts member 60 upon complete pivoting of the plate 26 into its operating position.

It will be appreciated that a number of changes may be made in the jet printer and method of the present invention. For example, it may be desired to apply a spring force directly to member 60 in opposition to the actuation force provided by arm 68, rather than applying the spring force to member 56, as shown in the drawings. This change in the structure of the printer might be desirable, for instance, if it were necessary to eliminate the twisting moment applied to the adhesive bonds by which the plate 26 is attached to members 56 and 60.

While the form of apparatus and the method of operation herein described constitute preferred embodiments of this invention, it is to be understood that the invention is not limited to this precise form of apparatus and method, and that changes may be made therein without departing from the scope of the invention which is defined in the appended claims.

What is claimed is:

1. A jet printer for printing on a print receiving medium, comprising:
   - print head means for generating a plurality of jet drop streams arranged in a row and directed at said print receiving medium, a plurality of fluid filaments emerging from said print head and breaking up into said jet drop streams,
   - drop charging means, including a notched charge electrode plate in which a plurality of charge electrodes are defined by electrically conductive coatings within notches spaced along one edge of said plate, said drop charging means permitting selective electrical charging of drops in each of the jet drop streams when electrical charging potentials are selectively applied to said charge electrodes and said charge electrodes partially surround corresponding fluid filaments,
   - drop control means for deflecting said drops in dependence upon the electrical charges carried thereby and for catching at least some of said drops,
   - mounting means for pivotally supporting said charging means such that said charge electrode plate may be pivoted between an operating position in which each charge electrode partially surrounds a corresponding one of said fluid filaments emerging from said print head, and a retracted position in which said charge electrodes are retracted from said fluid filaments, said mounting means providing for pivoting said charge electrode plate about an axis parallel to each of said streams and in line with said row of jet drop streams, and
   - means for pivoting said charge electrode plate into said operating position after start-up of said print head means and for pivoting said charge electrode plate into said retracted position prior to shutdown of said print head means, whereby contamination of said charging means by jet drops generated unstably at start-up and shutdown is prevented.

2. The jet printer of claim 1 in which said mounting means comprises:
   - means defining a pivot support, mounted to said print head means at one end thereof, for pivotally engaging said drop charging means, and
   - means defining a support surface, mounted to said print head means at a second end thereof opposite said one end, for supporting the opposite end of said drop charging means, and permitting said drop charging means to slide over said support surface as said charge electrode plate is pivoted.

3. The jet printer of claim 2 in which said means defining a pivot support comprises:
   - a first bracket attached to said print head means, and
   - a pivot shaft supported by said first bracket, generally parallel with said fluid filaments and in line with said row of jet drop streams.

4. The jet printer of claim 3 in which said means defining a support surface comprises:
   - a second bracket attached to said print head means, and
   - a first stop, supported by said second bracket, for contacting said drop charging means as said charge electrode plate is pivoted into said retracted position.

5. The jet printer of claim 4 in which said drop charging means further comprises:

a first end member attached to said charge electrode plate at a first end thereof and defining a pivot opening engaging said pivot shaft, and a second end member attached to said charge electrode plate at a second end thereof and defining an opening therein engaging said first stop.

6. The jet printer of claim 5 in which said first and second end members are adhesively bonded to said charge electrode plate.

7. The jet printer of claim 5 further comprising a second stop, mounted on said print head, for contacting said second end member when said charge electrode plate is pivoted into said operating position.

8. The jet printer of claim 5 in which said means for pivoting said charge electrode plate comprises actuator means for applying an actuation force to said second end member tending to move said charge electrode plate into said operating position.

9. The jet printer of claim 8 in which said means for pivoting said charge electrode plate further comprises spring means for applying a spring force to said drop charging means in opposition to said actuation force.

10. A method of operating a jet printer of the type having a print head producing a plurality of jet drop streams arranged in a row and directed at a print receiving medium, a notched charge plate defining charge electrodes in notches spaced along an edge of the plate, deflection means for generating an electrical deflection field through which the jet drop streams pass, such that charged ones of the drops in said jet drop streams are deflected, whereas uncharged drops are not deflected, and drop catcher means for catching a portion of the drops from the jet drop streams so as to permit selective deposit of drops on a print receiving medium, comprising the steps of:

initiating production of said jet drop streams with said charge plate being retracted from said streams, and thereafter pivoting said charge plate into an operating position in which said charge electrodes are in sufficient proximity to said streams to permit selective charging of drops in said streams, said charge plate being pivoted about an axis which is parallel to said streams and aligned with said row.

11. The method of claim 10 in which said method further comprises the steps of:

pivoting said charge plate about said axis from said operating position into a retracted position in which said charge plate is sufficiently removed so as not to become contaminated by unstable jet drop streams, and thereafter terminating production of said jet drop streams.

* * * * *